United States Patent [19]

Jubanowsky

[11] 4,435,218

[45] Mar. 6, 1984

[54] VISCOSITY INCREASING ADDITIVE FOR NON-AQUEOUS FLUID SYSTEMS

[76] Inventor: Louis J. Jubanowsky, 310 Indian Trail, Mountainside, N.J. 07092

[21] Appl. No.: 441,428

[22] Filed: Nov. 15, 1982

[51] Int. Cl.$^3$ ...................... C08L 91/00; C08L 91/06; C08K 5/17
[52] U.S. Cl. .................................. 106/266; 106/272; 106/287.17; 523/216; 524/245
[58] Field of Search ........... 106/270, 271, 272, 287.17, 106/266; 568/853; 524/245

[56] References Cited

U.S. PATENT DOCUMENTS 3,937,678  2/1976  Yasuda et al. ...................... 106/272
3,977,894  8/1976  White ................................. 106/272

*Primary Examiner*—Theodore Morris
*Attorney, Agent, or Firm*—Mathews, Woodbridge, Goebel, Laughlin, Pugh & Collins

[57] ABSTRACT

An organoclay rheological additive for non-aqueous fluid systems comprising an organoclay activated with a solid alcohol.

10 Claims, No Drawings

VISCOSITY INCREASING ADDITIVE FOR NON-AQUEOUS FLUID SYSTEMS

BACKGROUND OF THE INVENTION

Many different types of rheological agents are used in non-aqueous fluid systems such as paints, varnishes, enamels, waxes, epoxies, mastics and the like. These fluid systems often contain finely divided suspended materials, such as pigments and the like. Rheological agents are added to provide viscosity control, sag control, pigment suspension, and related benefits.

Various organo modified clays and other inorganic and organic compounds have been used in the past to produce these rheological effects. The organophilic clays, however, which have been used in prior compositions require the use of polar solvent activators and are usually added during manufacture. If the polar solvent activators are not used, the desired rheological properties, viscosity build, sag control and pigment setting control are not fully achieved, that is, only a portion of the clay's thickening ability is obtained. Dispersion of these organophilic clays are difficult in systems such as low viscosity paints. Proper activation at point of manufacture is also difficult.

U.S. Pat. No. 3,977,894 issued Aug. 31, 1976 to Robert W. White et al discloses a self-activating organoclay rheological additive for non-aqueous fluid systems which is a homogeneous mixture of an organically modified montmorillonite clay and two solid waxes, glyceryl tri-12-hydroxystearate and an amide wax. The amide wax has the formula R—NH—(CH$_2$)$_n$—NH—HSA wherein n is from one to eighteen, HSA is the acyl radical of 12-hydroxystearic acid and R is HSA or hydrogen. This system requires the fluid system to be heated during the addition of the special self-activating clay. This heat requirement is difficult to obtain if the paint system, for example, is of low viscosity, and the shear effect during paint processing does not develop sufficient heat. Further this cannot be used for correcting the viscosity of let-down finished paints since the paint is always at approximately room temperature. U.S. Pat. No. 4,208,218 issued June 17, 1980 to Claude M. Finlayson discloses an organoclay rheological addition for non-aqueous fluid systems comprising a smectite-type clay and a benzyl dialkyl ammonium compound. The use of a benzyl compound as derived from coal tar origin is potentially hazardous for such paint applications as coating for food cans, food package coatings and similar uses.

It is an object of this invention to provide an additive for controlling the viscosity, sag and pigment suspension of a non-aqueous fluid system which does not require heating of the fluid system or shear dispersion. Another object of the invention is to provide a simplified product which does not require further treatment at the point of manufacture. Other objects and the advantages of the invention will appear from the following detailed description.

DETAILED DESCRIPTION OF THE INVENTION

A self-activating rheological agent has been produced comprising a montmorillonite clay modified with a quaternary ammonium compound, and alcohol solid at normal room temperature. The organoclay is one which has been treated with a quaternary ammonium compound which opens the clay structure to produce a more useful clay material. These organo modified clays are more fully disclosed in U.S. Pat. No. 2,531,427 issued to Ernst A. Hauser and are sold by N L Industries, Inc. under the tradename "Bentone".

The solid alcohol is preferably one which has a melting point between about 18° C. to about 150° C. or most preferred about 100° C. to about 150° C. The prefered type of solid alcohol is one having the formula:

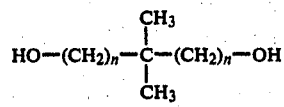

wherein n is from one to five.

Particularly good results have been obtained when using as the alcohol 2,2-dimethyl-1,3-propanediol (neopentyl glycol). Typical of suitable alcohols are 2-methyl-2-propanol; erythritol; neopentyl alcohol; 2,3,3-trimethyl-2-butanol; also suitable are monopalmitate glycol; 1,3-dipalmitate glycol; 1-monolaurate glycol; 1-monooleate glycol; 1-monostearate glycol; alpha, beta-dihydroxy stearic acid; and 9,10-dihydroxy octadecanoic.

It is essential to this invention that the self-activating agent has a particle size of less than about 10 microns and preferably about 2 microns. It is also essential that the amine treated clay and the polar activator be combined at this point of manufacture for final product effectiveness. Other high molecular weight alcohols that are liquids such as propylene carbonate interfere with the process for obtaining the final micronization. We have found that the solid alcohols as mentioned above activate satisfactorily and do not interfere with micronization. This additive will be effective in letdown paint systems or low viscosity systems not developing heat and also satisfactory for use in food packaging and container coating applications. The amount of the solid alcohol added to the clay for purposes of this invention must be sufficient to impart to the clay the enhanced activation characteristics. The prefered amount of solid alcohol added to the organophilic clay is about 10% by weight. The minimum amount is about 3%. As a general rule amounts in excess of 20% do not serve any useful purpose. The solid alcohol and organophilic clay can be mixed by utilizing any of the conventional mixing procedures. The desired particle size and mixing is preferably obtained by using an air mill.

The non-aqueous fluid compositions in which the self activating organophilic clays are useful include paints, varnishes, enamels, waxes, epoxies, mastics, adhesives, cosmetics and the like. These fluids may be prepared by any conventional method, such as with colloid mills, roller mills, ball mills, and high speed dispersers, in which the pigment materials become well dispersed in the organic vehicle by the shear used in processing.

The organophilic clay of this invention is employed in amounts sufficient to obtain the desired rheological properties such as viscosity and sag control and prevention of settling and hard packing of pigments present in the fluid compositions. Amounts of the self-activated clay employed in the non-aqueous fluid system is preferably between 0.3% and 2.0% to yield the desired rheological effects. As a general rule lower quantities of the composition of this invention are required than heretofore necessary.

The following examples are given to illustrate the invention, but are not deemed to be limiting thereof. All percentages given throughout the specification are based upon weight unless otherwise indicated.

EXAMPLE 1

A self-activated clay was prepared by mixing in an air mill the following composition:
90% bentonite clay modified with a quaternary ammomium compound
10% neopentylglycol
The mixing was continued until the composition had a particle size of 2 microns maximum.

EXAMPLE 2

The self-activating clay produced in accordance with Example 1 was added without heat from shearing to a finished alkyd paint having the following formulation:
Oil modified alkyd resin: 483 lbs.
Mineral spirits (Rule 66 type): 194.5 lbs.
Pigment (TiO$_2$): 325 lbs.
Lead Naphtenate (34%): 7.1 lbs.
Calcium Naphtenate (4%): 8 lbs.
Cobalt Napthenate (6%): 2.9 lbs.
The results are shown in Table I using various quantities of the composition of Example 1. In contrast, a similar formulation using organoclay alone without heat from shearing had a viscosity of 260 centipoise and if methanol is added at the point of manufacture to the organoclay composition in 25% by weight based on the weight of the organoclay, the viscosity is 840 centipoise.

TABLE I

| Percent of self-activating clay | 0 | 10% |
|---|---|---|
| Viscosity (centipoise) | 260 | 1250 |

All viscosity measurements are Brookfield RFV, 10 RPM, spindle #3 at 68° F.

While the invention has been described with reference to its preferred embodiment thereof it will be appreciated by those of ordinary skill in the art that various changes can be made without departing from the scope of the invention and such modifications are intended to be included within the scope of the claims.

What is claimed is:

1. A self-activating organoclay rheological composition useful as an additive for non-aqueous fluid systems, comprising a mixture of an organo modified clay and an alcohol having the formula

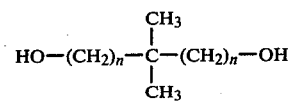

wherein n is a whole integer from 1 to 5.

2. The composition of claim 1 wherein the particle size of the composition is less than 10 microns.

3. The composition of claim 1 wherein the particle size of the composition is about 2 microns.

4. The composition of claim 1 wherein the particle size of the composition is less than 10 microns and the alcohol is neopentylglycol.

5. In a non-aqueous fluid system used for coating the surface of an article, the improvement which comprises including in such a system a mixture of an organo modified clay and an alcohol having the formula

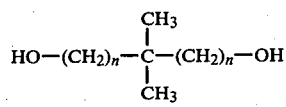

wherein n is a whole integer from 1 to 5, to control the rheological properties of the composition.

6. The non-aqueous fluid system of claim 5 wherein the mixture of organo modified clay and alcohol has a particle size of less than 10 microns.

7. The non-aqueous fluid system of claim 5 wherein said alcohol is neopentylglycol.

8. The non-aqueous fluid composition of claim 5 wherein said non-aqueous fluid system is an oil modified alkyd resin system containing mineral solvents as the non-aqueous fluid.

9. A self-activating organoclay rheological composition useful as an additive for non-aqueous fluid systems comprising an alcohol having a melting point of at least 18° C., selected from a group consisting of 1,3-dipalmitate glycol; 1-monolaurate glycol; 1-monooleate glycol; 1-monostearate glycol; alpha, beta-dihydroxy stearic acid; and 9,10-dihydroxy octadecanoic.

10. In a non-aqueous fluid system used for coating the surface of an article, the improvement which comprises including in such a system a mixture consisting of an organo modified clay and an alcohol having a melting point of at least 18° C., selected from a group consisting of 1,3-dipalmitate glycol; 1-monolaurate glycol; 1-monooleate glycol; 1-monostearate glycol; alpha, beta-dihydroxy stearic acid; and 9,10-dihydroxy octadecanoic.

* * * * *